United States Patent Office 3,733,331
Patented May 15, 1973

3,733,331
**ACYLATED N-(ALKYLAMINOALKYL)-
AMINOPYRIDINES**
Rudolf Hiltmann, Hartmund Wollweber, and Friedrich Hoffmeister, Wuppertal-Elberfeld, and Hans-Gunther Kroneberg, Wuppertal-Vohwinkel, Germany, assignors to Bayer Aktiengesellschaft, Leverkusen, Germany
No Drawing. Continuation-in-part of abandoned application Ser. No. 761,794, Sept. 23, 1968. This application Nov. 30, 1970, Ser. No. 93,844
Claims priority, application Germany, Sept. 25, 1967,
P 19 70 929.8
Int. Cl. C07d *39/00*
U.S. Cl. 260—293.54      12 Claims

ABSTRACT OF THE DISCLOSURE

Novel and improved analgetics are provided of the formula:

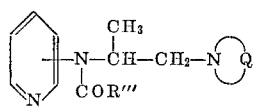

in which R''' is hydrogen or alkyl or alkenyl of 1–4 carbon atoms, and

is azabicyclo substituted or not by one or more alkyl groups or such having a double bond, and unacylated intermediates for said analgetics.

CROSS REFERENCE

This application is a contaniuation-in-part application of U.S. Ser. No. 761,794 filed Sept. 23, 1968, now abandoned.

DETAILED DESCRIPTION

U.S. Pat. No. 3,163,654 describes a process for the production of pyridine derivatives having analgetic effect which comprises acylating an N-(alkylaminoalkyl)-aminopyridine of the formula:

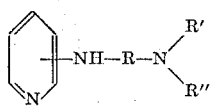

in which R is a straight-chain or branched alkylene radical of 2–5 carbon atoms, R' is a saturated or unsaturated alkyl radical of 1–4 carbon atoms or a lower aralkyl radical, and R'' is hydrogen or a saturated or unsaturated alkyl radical of 1–4 carbon atoms, or R' together with either R'' or R and the adjacent nitrogen atom may also form a 5- or 6-membered heterocyclic ring.

It has now been found in accordance with the present invention that pyridine derivatives with a stronger and better analgetic effect and a more advantageous therapeutic index are obtained, when N-(1-alkylamino-prop-2-yl)-aminopyridines of the formula:

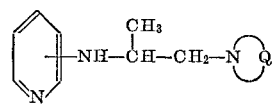

in which

is an azabicycloalkyl radical which may be substituted by one or more alkyl groups and which may also contain a double bond, are reacted with aliphatic acylating agents which contain 1 to 5 carbon atoms.

There are thereby formed novel and therapeutically improved compounds of the formula:

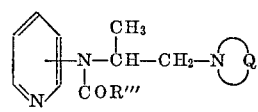

in which

has the same meaning as above and R''' is hydrogen or an alkyl or alkenyl group of 1–4 carbon atoms.

The production of these N-acyl-N-(1-alkylamino-prop-2-yl)-aminopyridines is carried out according to known types of methods by treating corresponding N-(1-alkyl-amino-prop-2-yl)-aminopyridines with acylating agents, such as saturated or unsaturated aliphatic carboxylic acid halides or anhydrides or their corresponding mixed anhydrides.

Those N-(1-alkylamino-prop-2-yl)-aminopyridines used as starting materials which have not yet been described in the literature and which form part of this invention can be obtained by known methods. For example, aminopyridines can be alkylated with corresponding 1-alkylamino-isopropyl halides in the presence of sodium amide. From the resultant mixture of the two isomers:

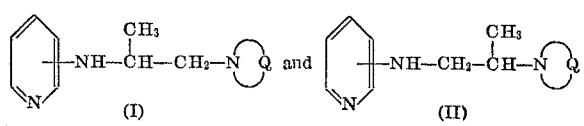

the desired isomer (I) can be separted by known methods, for example, by crystallization of suitable salts, and the purity can be contolled with the aid of the NMR-spectra. The aforesaid 1-alkylamino-isopropyl halides are prepared, for example, according to known methods by the reaction of propylene oxide with corresponding heterocyclic amines and subsequent halogenation of the resultant alkylamino-isopropanols, for example, with thionyl chloride.

However, the synthesis of the N-(1-alkylamino-prop-2-yl)-aminopyridines mentioned above can also be carried out by reacting corresponding azabicycloalkanes with chloroacetone, catalytically reducing the resultant amino-ketones in the presence of ammonia, and heating the resultant tertiary-primary 1,2-diaminopropanes with halopyridines in the presence of copper bronze and potassium carbonate:

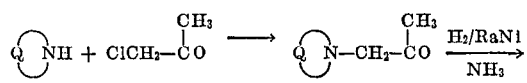

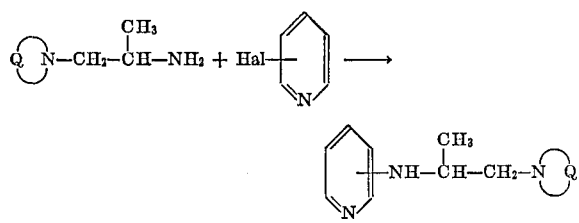

Examples of saturated azabicycloalkanes are:

2-azabicyclo-[2,2,2]-octane,
3-azabicyclo-[3,2,1]-octane,
2-methyl-3-azabicyclo-[3,2,1]-octane,
2-ethyl-3-azabicyclo-[3,2,1]-octane,
2,4-dimethyl-3-azabicyclo-[3,2,1]-octane,
1,8,8-trimethyl-3-azabicyclo-[3,2,1]-octane,
1,6,6-trimethyl-3-azabicyclo-[3,2,1]-octane,
2,2,4,4-tetramethyl-3-azabicyclo-[3,2,1]octane,
2-azabicyclo-[3,2,1]-octane,
6-azabicyclo-[3,2,1]-octane,
8-azabicyclo-[3,2,1]-octane,
3-azabicyclo-[4,1,1]-octane,
3-azabicyclo-[3,3,0]-octane,
3-azabicyclo-[3,3,1]-nonane,
6-methyl-3-azabicyclo-[3,3,1]-nonane,
9-azabicyclo-[3,3,1]-nonane,
2-azabicyclo-[3,3,1]-nonane,
2-azabicyclo-[3,2,2]-nonane,
3-azabicyclo-[3,2,2]-nonane,
9-azabicyclo-[4,2,1]-nonane,
2-azabicyclo-[4,3,0]-nonane,
cis- and trans-8-azabicyclo-[4,3,0]-nonane,
1,6-dimethyl-8-azabicyclo[4,3,0]-nonane,
cis- and trans-7-azabicyclo-[4,3,0]-nonane,
3-azabicyclo-[3,2,0]-heptane,
2-methyl-3-azabicyclo-[3,2,0]-heptane,
2-azabicyclo-[2,2,1]-heptane,
7-azabicyclo-[2,2,1]-heptane,
3-azabicyclo-[3,1,1]-heptane,
6-azabicyclo-[3,1,1]-heptane,
6-azabicyclo-[3,3,1]-heptane,
3-azabicyclo-[4,1,0]-heptane,
3-azabicyclo-[3,1,0]-hexane,
1-methyl-3-azabicyclo-[3,1,0]-hexane,
1,5-dimethyl-3-azabicyclo-[3,1,0]-hexane,
3-azabicyclo-[3,1,0]-hexane,
8-azabicyclo-[4,3,1]-decane,
cis- and trans-2-azabicyclo-[4,4,0]-decane,
cis- and trans-3-azabicyclo-[4,4,0]-decane.

Examples of unsaturated azabicycloalkenes are: 3-azabicyclo - [3,2,2]-non-6-ene and 8-azabicyclo-[4,3,0]-non-3-ene.

The acyl compounds so obtained are oils which can be distilled in a vacuum and which form non-toxic water-soluble salts with pharmacologically unobjectionable inorganic or organic acids. Suitable acids are, for example, hydrochloric acid, sulphuric acid, nitric acid, phosphoric acid, methane-sulphonic acid, acetic acid, succinic acid, glutaric acid, maleic acid, fumaric acid, tartaric acid, citric acid, mandelic acid and others.

The new compounds are racemates and can therefore be resolved in known manner into their optically active antipodes.

Dosage forms suitable for pharmaceutical application are, for example, dragees, capsules, suppositories, injectable solutions, etc., which can be administered orally, subcutaneously, intravenously, rectally, etc. in amounts similar to known analgesics or those of the aforesaid patent.

EXAMPLE 1

A solution of 21 g. of N-[1-(3-azabicyclo-[3,2,0]-hept-3-yl)-prop-2-yl]-2-aminopyridine (B.P. 134–136° C./0.2 mm. Hg) is added dropwise to 19.7 g. of propionyl chloride in 30 ml. of methylene chloride, the mixture is stirred for a further half hour and the solvent is removed in a vacuum at a temperature below 40° C. The residue is dissolved in water, extracted several times with ether and the base is precipitated from the aqueous solution with a sodium hydroxide solution. The product is taken up with ether and the ethereal solution dried with potassium carbonate. After driving off the solvent, the residue is purified by distillation in a vacuum, 14.1 g. of N-propionyl-N-[1-(3-azabicyclo-[3,2,0]-hept-3-yl)-prop-2-yl]-2-aminopyridine of B.P. 160–161°/C./0.1 Hg being obtained in the form of a yellowish oil.

The starting material is prepared by reacting 3- azabicyclo-[3,2,0] - heptane with chloroacetone to form the aminoketone (B.P. 88–90° C./11 mm. Hg), catalytically reducing the latter in the presence of ammonia, and heating the resultant diamine (B.P. 80° C./11 mm. Hg) with 2-bromopyridine.

EXAMPLE 2

21 g. of N-[1-(3-azabicyclo-[3,2,0]-hept-3-yl)-prop-2-yl]-2-aminopyridine and 50 ml. of propionic acid anhydride are heated at 120° C. for 8 hours, the mixture is then concentrated by evaporation in a vacuum and the residue taken up with water. The base is precipitated from the solution with a sodium hydroxide solution, taken up with ether and the ethereal solution is dried with potassium carbonate. After driving off the solvent, the mixture is distilled in a vacuum and there are obtained 10.4 g. of the N-propionyl-N-[1-(3 - azabicyclo-[3,2,0]-hept-3-yl)-prop-2-yl]-2-aminopyridine of B.P. 160–161° C./0.1 mm. Hg.

EXAMPLE 3

By the method described in Example 2 there is obtained, from 21 g. of N-[1 - (3-azabicyclo-[3,2,0]hept-3-yl)-prop-2-yl]-2-aminopyridine and 50 ml. of acetic acid anhydride, 9.1 g. of N-acetyl-N-[1-(3-azabicyclo-[3,2,0]-hept - 3-yl)-prop-2-yl]-2-aminopyridine of B.P. 156–157° C./0.2 mm. Hg.

EXAMPLE 4

By the method described in Example 2 there is obtained, from 20 g. of N-[1 - (3-azabicyclo-[3,3,1]-non-3-yl)-prop - 2-yl]-2-aminopyridine (B.P. 152–155° C./0.4 mm. Hg) and 50 ml. of propionic acid anhydride, 7.5 g. of N-propionyl-N-[1-(3-azabicyclo-[3,3,1]-non-3-yl)-prop-2-yl]-2-aminopyridine of B.P. 168–170° C./0.2 mm. Hg.

The starting material is prepared by reacting 3 - azabicyclo - [3,3,1]-nonane with chloroacetone to form the aminoketone (B.P. 116° C./12 mm. Hg), catalytically reducing the latter in the presence of ammonia, and heating the resultant diamine (B.P. 120–122° C./13 mm. Hg) with 2-bromopyridine.

EXAMPLE 5

By the method described in Example 2 there is obtained, from 24 g. of N-[1-(3-azabicyclo-[3,2,2]-non-3-yl)-prop-2-yl]-2-aminopyridine (B.P. 148–150° C./0.5 mm. Hg) and 50 ml. of propionic acid anhydride, 12.1 g.

of N-propionyl - N - [1-(3-azabicyclo-[3,2,2]-non-3-yl)-prop-2-yl] - 2 - aminopyridine of B.P. 175–177° C./0.3 mm. Hg.

The starting material is prepared by reacting 3-azabicyclo-[3,2,2]-nonane with chloroacetone to form the aminoketone (B.P. 124° C./12 mm. Hg), catalytically reducing the latter in the presence of ammonia, and heating the resultant diamine (B.P. 118–120° C./12 mm. Hg) with 2-bromopyridine.

EXAMPLE 6

By the method described in Example 2 there is obtained, from 27 g. N-[1-(2-azabicyclo-[2,2,2]-oct-2-yl)-prop-2-yl]-2-aminopyridine (B.P. 142–1440 C./0.2 mm. Hg) and 50 ml. of propionic acid anhydride, 16.4 g. of N-propionyl - N - [1,(2-azabicyclo-[2,2,2]-oct-2-yl)-prop-2-yl] - 2 - aminopyridine of B.P. 171–173° C./0.1 mm. Hg.

The starting material is prepared by reacting isoquinuclidine with chloroacetone to form the aminoketone (B.P. 108–110° C./12 mm. Hg), catalytically reducing the latter in the presence of ammonia, and heating the resultant diamine (B.P. 118–120° C./12 mm. Hg) with 2-bromopyridine.

EXAMPLE 7

By the method described in Example 1 there is obtained, from 32.9 g. of N-[1-(3-azabicyclo-[3,2,1]-oct-3-yl)-prop-2-yl]-2-aminopyridine (B.P. 156–163° C./0.7 mm. Hg) and 14.4 g. of propionyl chloride, 24.9 g. of N-propionyl-N-[1-(3-azabicyclo-[3,2,1] - oct - 3-yl)-prop-2-yl]-2-aminopyridine of M.P. 56–57° C.

The starting material is prepared by reacting 3-azabicyclo-[3,2,1]-octane with chloroacetone to form the aminoketone (B.P. 99–103° C./11 mm. Hg), catalytically reducing the latter in the presence of ammonia, and heating the resultant diamine (B.P. 94–97° C./10 mm. Hg) with 2-bromopyridine.

EXAMPLE 8

By the method described in Example 1 there is obtained from 9.7 g. of N-[1-(1,8,8-trimethyl-3-azabicyclo-[3,2,1]-oct-3-yl)-prop-2-yl]-2-aminopyridine (B.P. 161–163° C./0.5 mm. Hg) and 3.6 g. of propionyl chloride, 6.7 g. of N-propionyl-N-[1-(1,8,8-trimethyl - 3 - azabicyclo-[3,2,1]-oct-3-yl)-prop-2-yl]-2-aminopyridine (B.P. 184–185° C./0.9 mm. Hg).

The starting material is prepared by reacting 1,8,8-trimethyl-3-azabicyclo-[3,2,1]-octane with chloroacetone to form the aminoketone (B.P. 120–124° C./10 mm. Hg), catalytically reducing the latter in the presence of ammonia, and heating the resultant diamine (B.P. 114–119° C./10 mm. Hg) with 2-bromopyridine.

EXAMPLE 9

According to the procedure described in Example 1, 18.1 g. of N-propionyl-N-[1-(3-azabicyclo-[3,1,0]-hex-3-yl)-prop-2-yl]-2-aminopyridine with a B.P.$_{0.8}$ of 169 to 172° C. is obtained from 21.7 g. of N-[1-(3-azabicyclo-[3,1,0]-hex-3-yl)-prop-2-yl]-2-aminopyridine (B.P.$_{0.4}$ of 130 to 137° C.) and 10.6 g. of propionyl chloride.

The starting material is prepared by acylating 3-azabicyclo-[3,1,0]-hexane with 2-chloropropionyl chloride, reacting the N-(2-chloropropionyl)-3-azabicyclo-[3,1,0]-hexane (B.P.$_{11}$ of 137 to 139° C.) obtained with 2-aminopyridine to obtain N-[2-(2-pyridylamino)-propionyl]-3-azabicyclo-[3,1,0]-hexane (M.P. of 135 to 136° C.) and reducing the latter compound with lithium aluminum hydride.

EXAMPLE 10

According to the procedure described in Example 1, 11.2 g. of N-propionyl-N-[1-(1,5-dimethyl-3-azabicyclo-[3,1,0]-hex-3-yl)-prop-2-yl] - 2 - aminopyridine with a B.P.$_{0.5}$ of 178 to 180° C. is obtained from 20.3 g. of N-[1-(1,5-dimethyl - 3 - azabicyclo - [3,1,0] - hex-3-yl)-prop-2-yl]-2-amino-pyridine (M.P. of 81 to 83° C.) and 9.5 g. propionyl chloride.

The starting material is prepared as follows: cis-1,2-dimethyl-cyclopropane-1,2-dicarboxylic acid dimethyl ester is converted, by heating with urea in the presence of sodium ethylate in alcoholic solution, to 1,2-dimethyl-1,2-cyclopropane dicarboximide (M.P. of 150 to 151° C.), which is then reduced to 1,5-dimethyl-3-azabicyclo-[3,1,0]-hexane (M.P. of 60 to 61° C.) by means of lithium aluminum hydride. The compound thus obtained is acylated with 2-chloropropionic acid chloride and the resulting N-(2-chloropropionyl)-1,5-dimethyl-3-azabicyclo-[3,1,0]-hexane (B.P.$_{0.5}$ of 121 to 124° C.) is reacted with 2 - aminopyridine to otbain N - [1 - (2-pyridylamino)-propionyl] - 1,5 - dimethyl-3-azabicyclo-[3,1,0]-hexane (M.P. of 144 to 145.5° C.), which is reduced with lithium aluminum hydride.

EXAMPLE 11

According to the procedure described in Example 1, 14.4 g. of α-N-propionyl - N - [1-(1-methyl-3-azabicyclo-[3,1,0]-hex-3-yl)-prop-2-yl] - 2 - aminopyridine with a B.P. $_{0.2}$ of 178° C. is obtained from 19.7 g. of α-N-[1-(1-methyl-3-azabicyclo-[3,1,0] - hex - 3 - yl) - prop-2-yl]-2-aminopyridine (B.P.$_{0.5}$ of 128 to 136° C.) and 8.6 g. propionyl chloride.

The starting material is prepared as follows: 1-methyl-cis-1,2-cyclopropane dicarboxylic acid is converted by melting with urea at 180° C. to 1-methyl-1,2-cyclopropane dicarboximide (M.P. of 117 to 119° C.), which is reduced to 1-methyl-3-azabicyclo-[3,1,0]-hexane (B.P. of 119° C.) by means of lithium aluminum hydride. The compound thus obtained is acylated with 2-chloropropionic acid chloride and the resulting mixture of diastereomeric N-(2-chloropropionyl)-1 - methyl - 3-azabicyclo-[3,1,0]-cyclohexane (B.P.$_{0.5}$ of 111 to 114° C.)is reacted with 2-aminopyridine. From the resulting mixture of diastereomeric N-[2-(2-pyridylamino)-propionyl]-1-methyl-3-azabicyclo-[3,1,0]-hexane, an α form with a melting point of 101 to 103° C. and a β form with a melting point of 139 to 143° C. can be obtained by fractional distillation from a mixture of acetic ester and petroleum ether. Reduction of the α form with lithium aluminum hydride yields the above-mentioned α-N-[1-(1-methyl - 3 - azabicyclo-[3,1,0]-hex-3-yl)-prop - 2 - yl]-2-aminopyridine with a B.P.$_{0.5}$ of 128 to 136° C.

EXAMPLE 12

According to the procedure described in Example 1, 15.1 g. of β-N-propionyl-N-[1-(1-methyl-3-azabicyclo-[3,1,0]-hex-3-yl)-prop-2-yl]-2-aminopyridine with a melting point of 72° C. is obtained from 14.7 g. of β-N-[1-(1-methyl - 3 - azabicyclo-[3,1,0]-hex-3-yl)-prop-2-yl]-2-aminopyridine (B.P.$_{0.5}$ of 122 to 130° C.), prepared from the β-N-[2-(2 - pyridylamino)-propionyl]-1-methyl-3-azabicyclo-[3,1,0]-hexane (M.P. of 139 to 143° C.) described in Example 11 by readucation with lithium aluminum hydride, and 6.4 g. propionyl chloride.

The foregoing examples are intended as illustrative and not as limitative and constitute representative compounds of the entire group of compounds described above and all of which have essentially the same properties and uses.

| R | Example | Rat toxicity DL₅₀, mg./kg. s.c. | Analgesic dose in rat nose DE₅₀, mg./kg. s.c. | Therapeutic index |
|---|---|---|---|---|
| (1) [N-hexane ring] | (1) | 366 (320–413) | 9.3 (7.0–12.2) | 39.4 |
| (1) [N-bicyclic] | 9 | 200 (160–250) | 1.58 (0.98–2.57) | 126.6 |
| (2) [N-bicyclic CH₃ A²] | 11 | 563.5 (477.6–665.8) | 2.44 (1.26–4.33) | 230.9 |
| (3) [N-bicyclic CH₃ B²] | 12 | 244.6 (159.0–366.7) | 1.38 (0.71–2.46) | 177.5 |
| (4) [N-bicyclic di-CH₃] | 10 | 178.5 (112.3–245.3) | 1.58 (0.98–2.57) | 113.2 |
| (5) [N-bicyclic] | 1+2 | 235 (214–259) | 2.34 (1.30–4.27) | 100.4 |
| (6) [N-bicyclic] | 7 | 87.9 (78.4–105.3) | 1.09 (0.66–2.05) | 80.0 |
| (7) [N-bicyclic] | 5 | 143.1 (99.5–191.7) | 2.77 (1.20–9.07) | 51.7 |

¹ Prior art compound of Example 1, Pat. No. 3,163,654.
² Cis-trans isomeric.

What is claimed is:

1. A compound selected from the group consisting of an 2-aminopyridine of the formula:

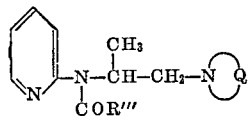

wherein

is an azabicycloalkyl ring of 6 to 9 members unsubstituted or substituted by from one to three methyl groups and R''' is alkyl of 1 to 4 carbon atoms, and the non-toxic pharmaceutically acceptable acid addition salts thereof.

2. The compound according to claim 1 which is N-propionyl-N-[1-(3-azabicyclo - [3,2,0] - hept-3-yl)-prop-2-yl]-2-aminopyridine.

3. The compound according to claim 1 which is N-acetyl-N-[1-(3-azabicyclo - [3,2,0]-hept-3-yl)-prop-2-yl]-2-aminopyridine.

4. The compound according to claim 1 which is N-propionyl-N-[1-(3-azabicyclo - [3,3,1] - non-3-yl)-prop-2-yl]-2-aminopyridine.

5. The compound according to claim 1 which is N-propionyl-N-[1-(3-azabicyclo - [3,2,2] - non-3-yl)-prop-2-yl]-2-aminopyridine.

6. The compound according to claim 1 which is N-propionyl-N-[1-(2-azabicyclo - [2,2,2] - oct-2-yl)-prop-2-yl]-2-aminopyridine.

7. The compound according to claim 1 which is N-propionyl-N-[1-(3-azabicyclo - [3,2,1] - oct-3-yl)-prop-2-yl]-2-aminopyridine.

8. The compound according to claim 1 which is N-propionyl-N-[1-(1,8,8-trimethyl - 3 - azabicyclo-[3,2,1]-oct-3-yl)-prop-2-yl]-2-aminopyridine.

9. The compound according to claim 1 which is N-propionyl-N-[1-(3-azabicyclo - [3,1,0] - hex-3-yl)-prop-2-yl]-2-aminopyridine.

10. The compound according to claim 1 which is N-propionyl-N-[1-(1,5-dimethyl - 3 - azabicyclo-[3,1,0]-hex-3-yl)-prop-2-yl]-2-aminopyridine.

11. The compound according to claim 1 which is α-N-propionyl - N - [1-(1-methyl-3-azabicyclo-[3,1,0]-hex-3-yl)-prop-2-yl]-2-aminopyridine.

12. The compound according to claim 1 which is β-N-propionyl - N - [1-(1-methyl-3-azabicyclo-[3,1,0]-hex-3-yl)-prop-2-yl]-2-aminopyridine.

References Cited

UNITED STATES PATENTS 3,163,654  12/1964  Hiltmann et al. _____ 260—294
3,299,044  1/1967   Cusic et al. _____ 260—239
3,497,508  2/1970   Houlihan _____ 260—247.7

HENRY R. JILES, Primary Examiner
G. T. TODD, Assistant Examiner

U.S. Cl. X.R.
260—293.69, 295 K, 296 B, 326.5 B, 326.85; 424—263, 267